(12) United States Patent
Wei et al.

(10) Patent No.: US 9,145,212 B1
(45) Date of Patent: Sep. 29, 2015

(54) PARACHUTE CONTROL SYSTEM AND METHOD FOR AN AIRCRAFT

(71) Applicant: Shenzhen Hubsan Intelligent Co., Ltd., Shenzhen (CN)

(72) Inventors: Jiajia Wei, Shenzhen (CN); Qiangwu Zhou, Shenzhen (CN)

(73) Assignee: SHENZHEN HUBSAN INTELLIGENT CO., LTD., Shenzhen (CN)

( * ) Notice: Subject to any disclaimer, the term of this patent is extended or adjusted under 35 U.S.C. 154(b) by 0 days.

(21) Appl. No.: 14/606,285

(22) Filed: Jan. 27, 2015

(30) Foreign Application Priority Data

Jun. 13, 2014 (CN) .......................... 2014 1 0260929

(51) Int. Cl.
*B64D 17/00* (2006.01)
*B64D 17/34* (2006.01)
*G07C 9/00* (2006.01)

(52) U.S. Cl.
CPC .............. *B64D 17/343* (2013.01); *B64D 17/00* (2013.01); *G07C 9/00158* (2013.01)

(58) Field of Classification Search
None
See application file for complete search history.

(56) References Cited

U.S. PATENT DOCUMENTS

| 4,408,737 | A | * | 10/1983 | Schwaerzler | ............. 244/110 D |
| 6,144,899 | A | * | 11/2000 | Babb et al. | ........................ 701/3 |
| 6,542,077 | B2 | * | 4/2003 | Joao | ........................ 340/426.16 |
| 6,587,046 | B2 | * | 7/2003 | Joao | ........................ 340/539.14 |
| 6,874,729 | B1 | * | 4/2005 | McDonnell | ..................... 244/63 |
| 7,277,010 | B2 | * | 10/2007 | Joao | ........................ 340/539.25 |
| 7,397,363 | B2 | * | 7/2008 | Joao | ........................ 340/539.11 |
| 7,584,928 | B2 | * | 9/2009 | Hoffmann | ..................... 244/149 |
| 7,703,720 | B2 | * | 4/2010 | Smith et al. | ................... 244/152 |
| 8,100,365 | B2 | * | 1/2012 | Fleming, III | .................. 244/139 |
| 8,200,379 | B2 | * | 6/2012 | Manfredi et al. | ............... 701/14 |
| 2003/0193404 | A1 | * | 10/2003 | Joao | ........................ 340/825.71 |
| 2003/0206102 | A1 | * | 11/2003 | Joao | ........................ 340/539.1 |
| 2004/0160319 | A1 | * | 8/2004 | Joao | ........................ 340/539.1 |
| 2005/0248444 | A1 | * | 11/2005 | Joao | ........................ 340/426.13 |
| 2009/0026319 | A1 | * | 1/2009 | Strong | ......................... 244/152 |
| 2009/0326792 | A1 | * | 12/2009 | McGrath | ....................... 701/120 |
| 2014/0014770 | A1 | * | 1/2014 | Teller et al. | ..................... 244/97 |
| 2014/0354402 | A1 | * | 12/2014 | Joao | ............................. 340/5.52 |

* cited by examiner

*Primary Examiner* — Christopher P Ellis
*Assistant Examiner* — Medhat Badawi
(74) *Attorney, Agent, or Firm* — IPro, Inc.; Na Xu

(57) ABSTRACT

The present disclosure provides a parachute control system for an aircraft which comprises a sensor device, a first control device, a second control device and a drive device. The sensor device is configured for sensing flight states of the aircraft, for converting the flight states to a sensor signal, and for transmitting the sensor signal to the first control device. The first control device is electrically connected to the sensor device for receiving the sensor signal, and is configured for judging whether the aircraft is in a normal flight state based on the sensor signal. If the aircraft is in an abnormal flight state, the first control device is configured to control the parachute to open and to terminate the operation of the aircraft. The present disclosure also provides a parachute control method for an aircraft. The disclosed parachute control system and method automatically control the parachute to open and terminate the operation of the aircraft when the aircraft is in an abnormal flight state, ensuring that the aircraft may descend at a slow pace when the aircraft encounters any operation issues and preventing any damage or loss of the aircraft.

16 Claims, 3 Drawing Sheets

PARACHUTE CONTROL SYSTEM AND METHOD FOR AN AIRCRAFT

TECHNOLOGY FIELD

The present disclosure relates to an aircraft, in particular to a parachute control system and method for an aircraft.

BACKGROUND

Small unmanned aircrafts often use wireless remote controls, and produce lift and change in direction of the aircraft through the forward and reverse rotations of the upper and lower rotors. Compared to large-scaled manned aircrafts, small-scaled aircrafts have the characteristics of having small size, flexibility, low cost, and convenience in landing, so small-scaled aircrafts are widely used in fields such as model aircraft, agriculture, fire prevention and aerial photography. Small-scaled aircrafts usually cannot complete ultra-long flight due to its characteristics such as small size, and light carry load. Therefore, during a flight, if the aircraft experiences a power shortage, it may result in flight shutdown of aircraft, which may very likely lead to a crash. On the other hand, when an operation system of the aircraft experiences a mechanical failure, or an electrical system failure, or an operator error, or an impact from a foreign object (bird strike) or other reasons, it will also cause the remote-controlled aircraft to shut down in flight.

Typically, protective measures taken against the flight shutdown often involve mounting a protection parachute device on the aircraft. The goal is to open the parachute during crash of the aircraft, to realize a slow landing of the aircraft. In prior art, the opening of parachute of a small-scaled aircraft usually involves a user control of a remote controller, and the controller sends out a control command to control the opening of the parachute. Because this mode of control involves a human action to open the parachute, when the aircraft flies at a height outside the view of a human user, a user will fail to determine the flight status of the aircraft and will fail to control the opening of the parachute through the remote controller. When the aircraft is in an abnormal flight state, the failure of timely opening of the parachute will cause a crash and damage to the aircraft.

SUMMARY

The present disclosure aims to provide a parachute control system and method for an aircraft, which automatically and accurately controls the parachute to open in accordance with a flight state, ensuring that the aircraft may descend at a slow pace when the aircraft encounters any operation issues and preventing any damage or loss of the aircraft.

On one aspect, embodiments of the present disclosure provide a parachute control system for an aircraft to control opening of a parachute of the aircraft. The aircraft comprises an aircraft body and the parachute mounted on the aircraft body. The parachute control system for an aircraft comprises a sensor device, a first control device, a second control device and a drive device. The sensor device is provided within the parachute, and is configured for sensing flight states of the aircraft, for converting the flight states to a sensor signal, and for transmitting the sensor signal to the first control device. The first control device is provided within the parachute, and the first control device is electrically connected to the sensor device for receiving the sensor signal, and is configured for judging whether the aircraft is in a normal flight state based on the sensor signal. If the aircraft is in an abnormal flight state, the first control device is configured to convert the sensor signal into a first control signal and a second control signal, to transmit the first control signal to the drive device, and to transmit the second control signal to the second control device. The drive device is provided within the parachute, and is electrically connected to the first control device and the parachute, and is configured for receiving the first control signal and for driving the parachute to open in accordance with the first control signal. The second control device is provided within the aircraft body, is electrically connected to the first control device, and is configured for receiving the second control signal, and for controlling the termination of operation of the aircraft body in accordance with the second control signal.

Preferably, the sensor device comprises a gyroscope, which is electrically connected to the first control device and is configured for sensing the flight inclination angle of the aircraft.

Preferably, the first control device is configured for confirming that the aircraft is in an abnormal flight state when the flight inclination angle is greater than a predetermined angle.

Preferably, the sensor device further comprises a GPS signal detector. The GPS signal detector is electrically connected to the first control device, and is configured for detecting a time interval of the aircraft to receive GPS signals.

Preferably, the first control device is further configured for confirming that the aircraft is in an abnormal flight state when the time interval is greater than a predetermined value of time interval.

Preferably, the sensor device further comprises a detector for remaining battery power. The detector for remaining battery power is electrically connected to the first control device, and is configured for detecting the remaining battery power of the aircraft.

Preferably, the first control device is further configured for confirming that the aircraft is in an abnormal flight state when the remaining battery power is less than a predetermined value of battery power.

Preferably, the parachute control system for the aircraft further comprises a remote controller. The remote controller is configured for receiving a control command triggered by a user, and is configured for transmitting a remote control signal to the second control device in accordance with the control command. The remote control signal is configured for terminating operation of the aircraft through the second control device in accordance with the remote control signal. The remote control signal is configured to be converted into a third control signal and the third control signal is configured to be transmitted to the first control device. The first control device is configured to convert the third control signal into a fourth control signal, and to transmit the fourth control signal to the drive device. The drive device is configured to drive the parachute to open in accordance with the fourth control signal.

On one aspect, embodiments of the present disclosure also provide a parachute control method for an aircraft for controlling opening of a parachute. The aircraft comprises an aircraft body and the parachute mounted on the aircraft body. The parachute control method comprises: sensing a flight state of the aircraft through a sensor device in a parachute control system for the aircraft; converting the flight state of the aircraft to a sensor signal and transmitting the sensor signal to a first control device of the parachute control system; judging whether the aircraft is in a normal flight state through the first control device based on the sensor signal; if the aircraft is in an abnormal flight state, converting the sensor signal into a first control signal and a second control signal through the first control device, transmitting the first control signal to a drive device in the parachute control system, and transmitting the second control signal to a second control device in the parachute control system; controlling the parachute to open through the drive device in accordance with the first control signal, and controlling the termination of operation of the aircraft through the second control device in accordance with the second control signal.

Preferably, the flight state comprises a flight inclination angle; wherein sensing flight state of the aircraft by the sensor device comprises: sensing a flight inclination angle of the aircraft by a gyroscope.

Preferably, judging whether the aircraft is in a normal flight state comprises: when the flight inclination angle is greater than a predetermined angle, confirming that the aircraft is in an abnormal flight state through the first control device.

Preferably, the flight state comprises a time interval of the aircraft to receive GPS signals; sensing the flight state of the aircraft by the sensor device comprises: sensing a time interval of the aircraft to receive GPS signals through a GPS signal detector.

Preferably, judging whether the aircraft is in a normal flight state comprises: when the time interval is greater than a predetermined value of time interval, confirming that the aircraft is in an abnormal flight state through the first control device.

Preferably, the aircraft flight state comprises a remaining battery power of the aircraft; sensing the flight state of the aircraft by the sensor device comprises: detecting the remaining battery power of the aircraft by a detector for remaining battery power.

Preferably, judging whether the aircraft is in a normal flight state comprises: when the remaining battery power of the aircraft is less than a predetermined value of battery power, confirming that the aircraft is in an abnormal flight state through the first control device.

Preferably, the parachute control method further comprises: receiving a control command from a remote controller triggered by a user, and transmitting a remote control signal to the second control device in accordance with the control command; terminating operation of the aircraft through the second control device in accordance with the remote control signal, converting the remote control signal into a third control signal and transmitting the third control signal to the first control device; converting the third control signal into a fourth control signal through the first control device, and transmitting the fourth control signal to the drive device; and driving the parachute to open through the drive device.

Therefore, the present disclosure provides a parachute control system and method for an aircraft, which automatically sense the flight state of an aircraft, and automatically control the parachute to open and terminate the operation of the aircraft. When the aircraft flies at an height and range out of a view of a user, if the aircraft is in an abnormal flight state, the aircraft is configured to realize automatic control of the parachute to open and automatic termination of the operation of the aircraft, ensuring that the aircraft may descend at a slow pace when encountering any operation issues and preventing any damage or loss of the aircraft.

BRIEF DESCRIPTION OF FIGURES

In order to more clearly illustrate the technical schemes, the following embodiments are illustrated together with the accompanying drawings. It is obvious that the following descriptions of the drawings depict only some embodiments. Those skilled in the art may derive other drawings from the current drawings without any inventive effort.

DETAILED DESCRIPTION

Below are a detailed description of the embodiments of the disclosure in view of the accompanying drawings, and the clear and detailed description of the technical schemes of the present disclosure.

Figure 1:
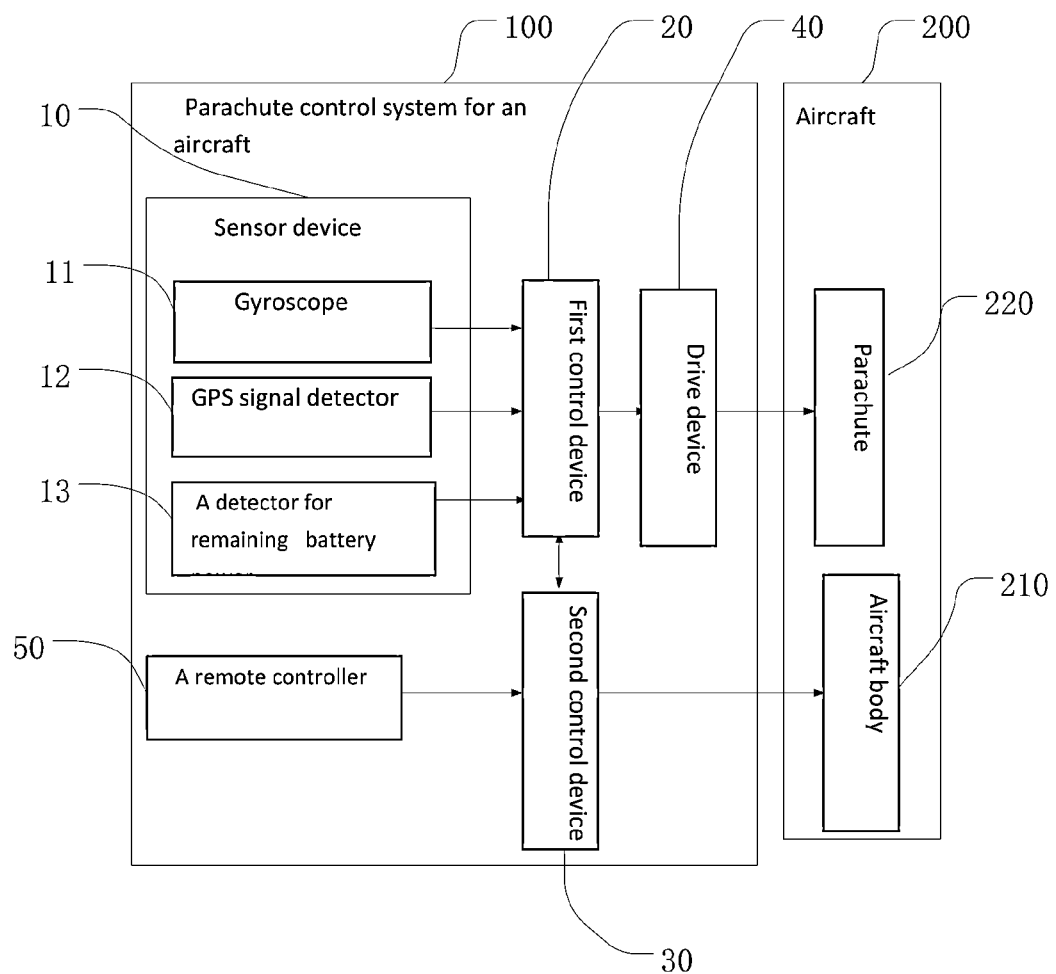
FIG. 1 shows a diagram of components for a parachute control system for an aircraft according to an embodiment of the present.

As shown in FIG. 1, according to an embodiment of the present disclosure, a parachute control system for an aircraft 100 is provided to control opening of a parachute of the aircraft 200. The aircraft 200 comprises an aircraft body 210 and the parachute 220 mounted on the aircraft body 210. The parachute control system for an aircraft 100 comprises a sensor device 10, a first control device 20, a second control device 30 and a drive device 40.

The sensor device 10 is provided within the parachute 220, and is configured for sensing flight states of the aircraft 200, for converting the flight states of the aircraft 200 to a sensor signal, and for transmitting the sensor signal to the first control device 20.

The first control device 20 is provided within the parachute 220, and the first control device 20 is electrically connected to the sensor device 10 for receiving the sensor signal, and is configured for judging whether the aircraft 200 is in a normal flight state based on the sensor signal. If the aircraft 200 is in an abnormal flight state, the first control device 20 is configured to convert the sensor signal into a first control signal and a second control signal, to transmit the first control signal to the drive device 40, and to transmit the second control signal to the second control device 30.

The drive device 40 is provided within the parachute 220, and is electrically connected to the first control device 20 and the parachute 220, and is configured for receiving the first control signal and for driving the parachute 220 to open in accordance with the first control signal.

The second control device 30 is provided within the aircraft body 210, is electrically connected to the first control device 20, and is configured for receiving the second control signal, and for controlling the termination of operation of the aircraft body 210 in accordance with the second control signal.

Therefore, the present disclosure provides a parachute control system for an aircraft 100, which automatically sense the flight state of the aircraft 200, and automatically control the parachute 220 to open and terminate the operation of the aircraft body 210. When the aircraft 200 flies at an height and range out of a view of a user, if the aircraft 200 is in an abnormal flight state, the aircraft 200 is configured to realize automatic control of the parachute 220 to open and automatic termination of the operation of the aircraft body 210 through the parachute control system for an aircraft 100, ensuring that the aircraft 200 may descend at a slow pace when encountering any operation issues and preventing any damage or loss of the aircraft 200.

According to an embodiment, the sensor device 10 comprises a gyroscopell, a GPS signal detector 12 and a detector for remaining battery 13.

The gyroscope 11 is electrically connected to the first control device 20 and is configured for sensing the flight inclination angle of the aircraft 200. The first control device 20 is also configured for confirming that the aircraft 200 is in an abnormal flight state when the flight inclination angle is greater than a predetermined angle. In contrast, when the flight inclination angle is smaller than the predetermined angle, the first control device 20 is also configured for confirming that the aircraft 200 is in a normal flight state.

According to an embodiment, a predetermined angle is 45°.

The GPS signal detector 12 is electrically connected to the first control device 20, and is configured for detecting a time interval of the aircraft 200 to receive GPS signals. The first control device 20 is further configured for confirming that the aircraft 200 is in an abnormal flight state when the time interval is greater than a predetermined value of time interval. In contrast, when the time interval is smaller than a predetermined value of time interval, the first control device 20 is also configured for confirming that the aircraft 200 is in a normal flight state.

According to an embodiment, a predetermined value of time interval is 10 ms (millisecond).

The detector for remaining battery power 13 is electrically connected to the first control device 20, and is configured for detecting the remaining battery power of the aircraft 200. The first control device 20 is further configured for confirming that the aircraft 200 is in an abnormal flight state when the remaining battery power is less than a predetermined value of battery power. In contrast, when the remaining battery power is greater than a predetermined value of battery power, the first control device 20 is further configured for confirming that the aircraft 200 is in a normal flight state.

Furthermore, the parachute control system for the aircraft 100 further comprises a remote controller 50. The remote controller 50 is configured for receiving a control command triggered by a user, and is configured for transmitting a remote control signal to the second control device 30 in accordance with the control command. The remote control signal is configured for terminating operation of the aircraft body 210 through the second control device 30 in accordance with the remote control signal. The remote control signal is configured to be converted into a third control signal and the third control signal is configured to be transmitted to the first control device 20. The first control device 20 is configured to convert the third control signal into a fourth control signal, and to transmit the fourth control signal to the drive device 40. The drive device 40 is configured to drive the parachute 220 to open in accordance with the fourth control signal.

When the aircraft 200 is in a normal flight state, a user may choose to use the remote controller to control the parachute 220 to open based on user's need. Therefore, the presently disclosed parachute control system for the aircraft 100 not only realizes the automatic control of parachute to open but also realize the remote control of the opening of the parachute by a user, therefore providing convenience to the user.

Figure 2:
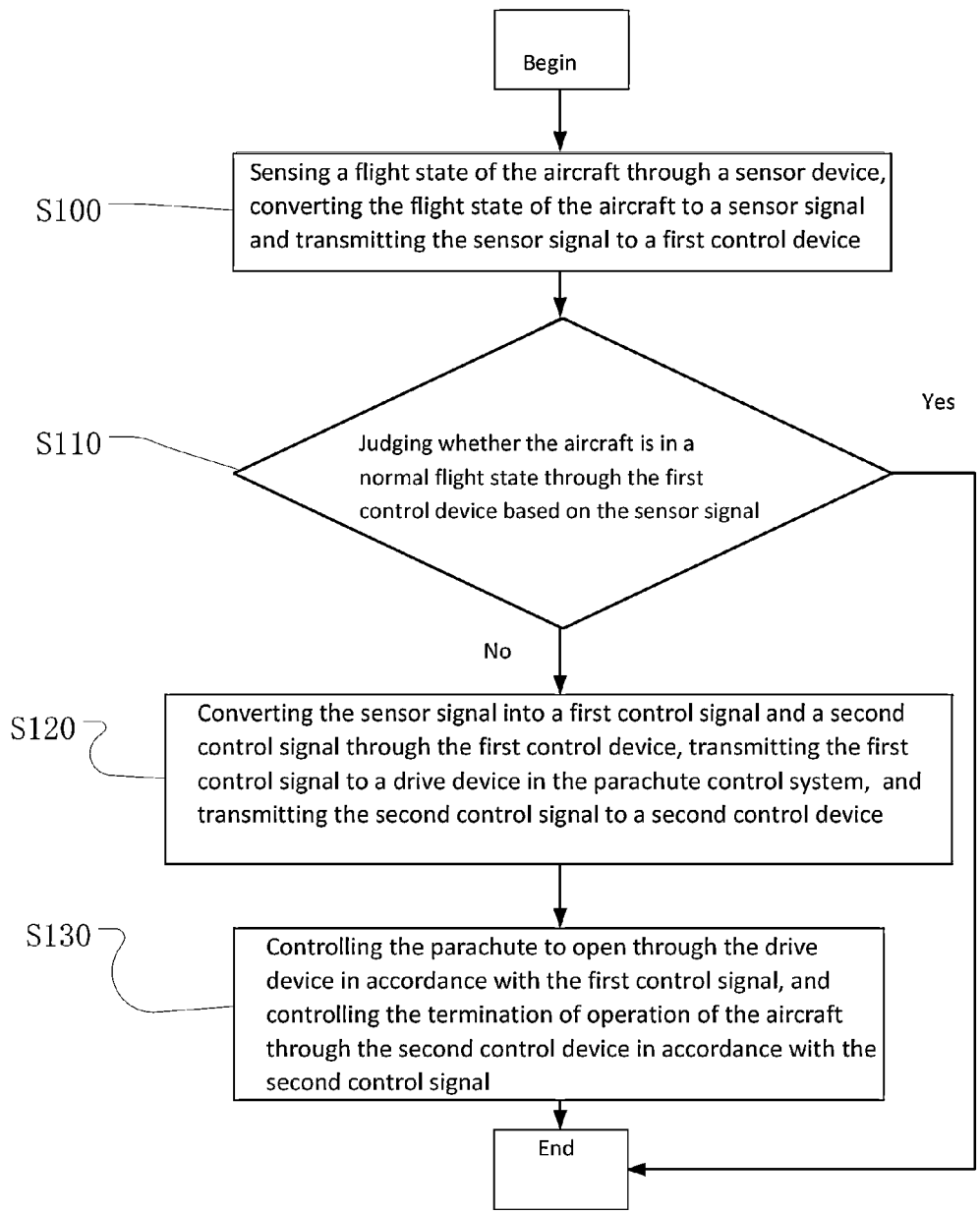
FIG. 2 shows a flowchart of an automatic control process to open a parachute of an aircraft in a parachute control method for an aircraft provided in the present disclosure.

FIG. 2 shows a flowchart of an automatic control process to open a parachute 220 of an aircraft 200 in a parachute control method for an aircraft provided in the present disclosure. According to an embodiment, the parachute control method for an aircraft is to control the process to open a parachute 220 of an aircraft 200. The aircraft 200 comprises an aircraft body 210 and the parachute 220 mounted on the aircraft body 210. The parachute control method comprises the following steps.

Step S100 comprises sensing a flight state of the aircraft 200 through a sensor device 10 in a parachute control system for the aircraft 100, and converting the flight state of the aircraft 200 to a sensor signal and transmitting the sensor signal to a first control device 20 of the parachute control system.

Step S110 comprises judging whether the aircraft 200 is in a normal flight state through the first control device 20 based on the sensor signal.

Step S120 comprises: if the aircraft 200 is in an abnormal flight state, converting the sensor signal into a first control signal and a second control signal through the first control device 20, transmitting the first control signal to a drive device 40 in the parachute control system, and transmitting the second control signal to a second control device 30 in the parachute control system.

Step S130 comprises controlling the parachute 220 to open through the drive device 40 in accordance with the first control signal, and controlling the termination of operation of the aircraft 200 through the second control device 30 in accordance with the second control signal.

According to a first embodiment, the flight state comprises a flight inclination angle; sensing flight state of the aircraft 200 by the sensor device 10 comprises: sensing a flight inclination angle of the aircraft 200 by a gyroscope 11.

Judging whether the aircraft 200 is in a normal flight state comprises: when the flight inclination angle is greater than a predetermined angle, confirming that the aircraft 200 is in an abnormal flight state through the first control device 20.

When the flight inclination angle is smaller than the predetermined angle, confirming that the aircraft 200 is in a normal flight state through the first control device 20.

According to the embodiment, a predetermined angle is 45°.

According to a second embodiment, the flight state comprises a time interval of the aircraft 200 to receive GPS signals; sensing the flight state of the aircraft 200 by the sensor device 10 comprises: sensing a time interval of the aircraft 200 through a GPS signal detector 12. Judging whether the aircraft 200 is in a normal flight state comprises: when the time interval is greater than a predetermined value of time interval, confirming that the aircraft 200 is in an abnormal flight state through the first control device 20.

When the time interval is smaller than a predetermined value of time interval, confirming that the aircraft 200 is in a normal flight state through the first control device 20. According to the embodiment, a predetermined value of time interval is 10 ms (millisecond).

According to a third embodiment, the aircraft flight state comprises a remaining battery power of the aircraft 200; sensing the flight state of the aircraft by the sensor device 10 comprises: detecting the remaining battery power of the aircraft 200 by a detector for remaining battery power 13.

Judging whether the aircraft 200 is in a normal flight state comprises: when the remaining battery power of the aircraft 200 is less than a predetermined value of battery power, confirming that the aircraft 200 is in an abnormal flight state through the first control device 20. In contrast, when the remaining battery power is greater than a predetermined value of battery power, confirming that the aircraft 200 is in a normal flight state through the first control device 20.

Therefore, presently disclosed parachute control method for an aircraft automatically senses the flight state of the aircraft 200, and automatically control the parachute 220 to open and control the termination of the operation of the aircraft body 210. When the aircraft 200 flies at an height and range out of a view of a user, if the aircraft 200 is in an abnormal flight state, the aircraft 200 automatically controls the parachute 220 to open and automatically terminates of the operation of the aircraft body 210 through the parachute control system for an aircraft 100, ensuring that the aircraft 200 may descend at a slow pace when encountering any operation issues and preventing any damage or loss of the aircraft 200.

Figure 3:
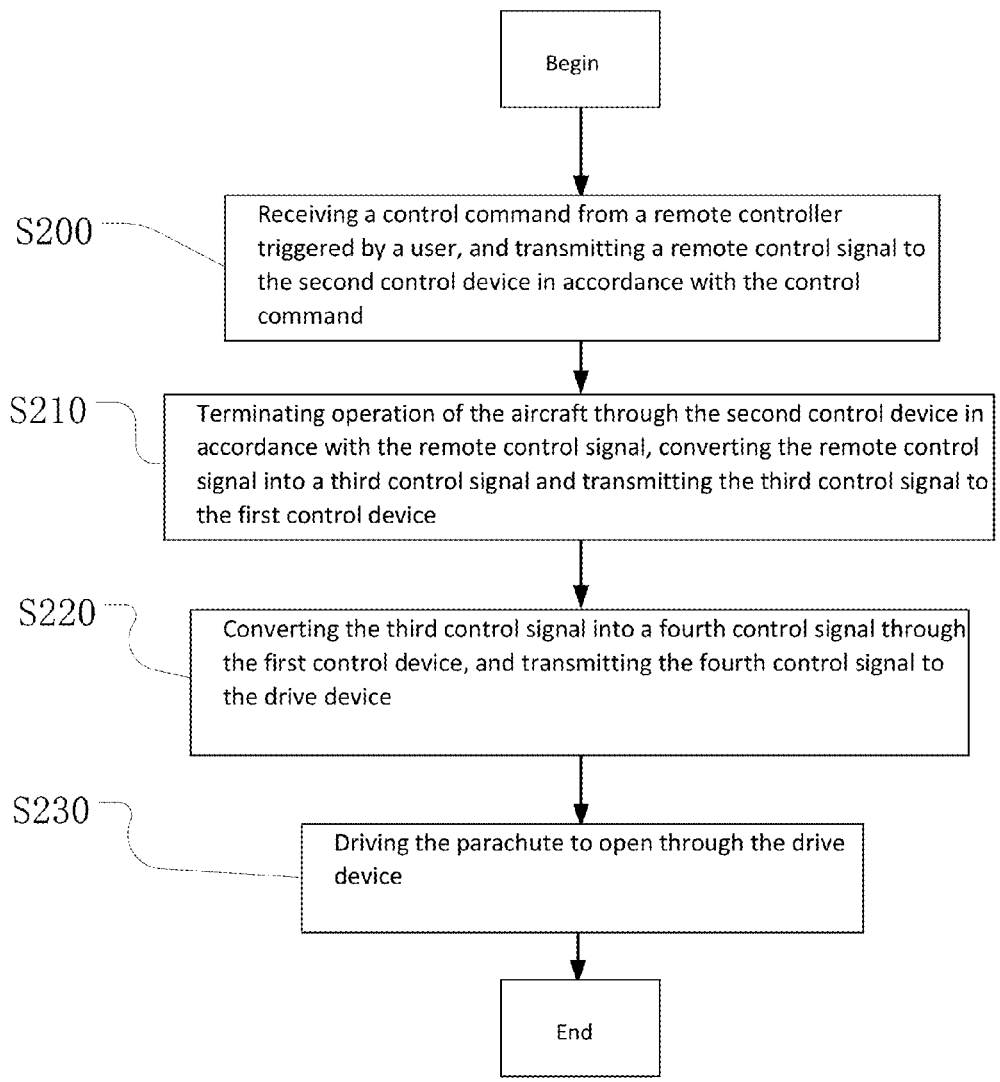
FIG. 3 shows a flowchart of a control process by a remote controller to open a parachute of an aircraft in a parachute control method for an aircraft provided in the present disclosure.

FIG. 3 shows a flowchart of a control process by a remote controller 50 to open a parachute 220 of an aircraft 200 in a parachute control method for an aircraft provided in the present disclosure. The parachute control method for an aircraft comprises the following steps.

Step S200 comprises receiving a control command from a remote controller 50 triggered by a user, and transmitting a remote control signal to the second control device 30.

Step S210 comprises terminating operation of the aircraft 200 through the second control device 30 in accordance with the remote control signal, converting the remote control signal into a third control signal and transmitting the third control signal to the first control device 20.

Step S220 comprises converting the third control signal into a fourth control signal through the first control device 20, and transmitting the fourth control signal to the drive device 40.

Step S230 comprises driving the parachute 220 to open through the drive device 20.

Therefore, when the aircraft 200 is in an abnormal flight state, a user may choose to control the parachute 220 to open based on a user's need through the parachute control method based on a remote controller. Thus, the parachute control method for an aircraft not only realizes automatic control of the parachute 220 to open, but also realize the user-controlled remote control of the parachute 220 to open, providing convenience to the user.

The descriptions above are preferred embodiments. Thus, it will be apparent to one skilled in the art that modifications may be made without departing from the protection scope of the claims set out below, and such modifications are within the protective scope of the present disclosure.

We claim:

1. A parachute control system for an aircraft to control opening of a parachute of the aircraft, wherein the aircraft comprises an aircraft body and the parachute mounted on the aircraft body; wherein the parachute control system for an aircraft comprises a sensor device, a first control device, a second control device and a drive device;

wherein the sensor device is provided within the parachute, and is configured for sensing flight states of the aircraft, for converting the flight states to a sensor signal, and for transmitting the sensor signal to the first control device;

wherein the first control device is provided within the parachute, and the first control device is electrically connected to the sensor device for receiving the sensor signal, and is configured for judging whether the aircraft is in a normal flight state based on the sensor signal; when the aircraft is in an abnormal flight state, the first control device is configured to convert the sensor signal into a first control signal and a second control signal, to transmit the first control signal to the drive device, and to transmit the second control signal to the second control device;

wherein the drive device is provided within the parachute, and is electrically connected to the first control device and the parachute, and is configured for receiving the first control signal and for driving the parachute to open in accordance with the first control signal; and wherein the second control device is provided within the aircraft body, is electrically connected to the first control device, and is configured for receiving the second control signal, and for controlling the termination of operation of the aircraft body in accordance with the second control signal.

2. The parachute control system for the aircraft according to claim 1, wherein the sensor device comprises a gyroscope, which is electrically connected to the first control device and is configured for sensing a flight inclination angle of the aircraft.

3. The parachute control system for the aircraft according to claim 2, wherein the first control device is configured for confirming that the aircraft is in the abnormal flight state when the flight inclination angle is greater than a predetermined angle.

4. The parachute control system for the aircraft according to claim 1, wherein the sensor device further comprises a GPS signal detector; wherein the GPS signal detector is electrically connected to the first control device, and is configured for detecting a time interval of the aircraft to receive GPS signals.

5. The parachute control system for the aircraft according to claim 4, wherein the first control device is further configured for confirming that the aircraft is in the abnormal flight state when the time interval is greater than a predetermined value of time interval.

6. The parachute control system for the aircraft according to claim 1, wherein the sensor device further comprises a detector for remaining battery power; wherein the detector for remaining battery power is electrically connected to the first control device, and is configured for detecting the remaining battery power of the aircraft.

7. The parachute control system for the aircraft according to claim 6, wherein the first control device is further configured for confirming that the aircraft is in the abnormal flight state when the remaining battery power is less than a predetermined value of battery power.

8. The parachute control system for the aircraft according to claim 1, wherein the parachute control system for the aircraft further comprises a remote controller; wherein the remote controller is configured for receiving a control command triggered by a user, and is configured for transmitting a remote control signal to the second control device in accordance with the control command; wherein the remote control signal is configured for terminating operation of the aircraft through the second control device in accordance with the remote control signal; wherein the remote control signal is configured to be converted into a third control signal and the third control signal is configured to be transmitted to the first control device; wherein the first control device is configured to convert the third control signal into a fourth control signal, and to transmit the fourth control signal to the drive device; and the drive device is configured to drive the parachute to open in accordance with the fourth control signal.

9. A parachute control method for an aircraft for controlling opening of a parachute;

wherein the aircraft comprises an aircraft body and the parachute mounted on the aircraft body; wherein the parachute control method comprises:

sensing a flight state of the aircraft through a sensor device in a parachute control system for the aircraft, wherein the sensor device is provided within the parachute;

converting the flight state of the aircraft to a sensor signal and transmitting the sensor signal to a first control device of the parachute control system, wherein the first control device is provided within the parachute;

judging whether the aircraft is in a normal flight state through the first control device based on the sensor signal;

when the aircraft is in an abnormal flight state, converting the sensor signal into a first control signal and a second control signal through the first control device, transmitting the first control signal to a drive device in the parachute control system, and transmitting the second control signal to a second control device in the parachute control system;

controlling the parachute to open through the drive device in accordance with the first control signal, and controlling the termination of operation of the aircraft through the second control device in accordance with the second control signal.

10. The parachute control method for the aircraft according to claim 9, wherein the flight state comprises a flight inclination angle; wherein sensing flight state of the aircraft by the sensor device comprises:

sensing the flight inclination angle of the aircraft by a gyroscope.

11. The parachute control method for the aircraft according to claim 10, wherein judging whether the aircraft is in the normal flight state comprises: when the flight inclination angle is greater than a predetermined angle, confirming that the aircraft is in the abnormal flight state through the first control device.

12. The parachute control method for the aircraft according to claim 9, wherein the flight state comprises a time interval of the aircraft to receive GPS signals; wherein sensing the flight state of the aircraft by the sensor device comprises: sensing the time interval of the aircraft to receive GPS signals through a GPS signal detector.

13. The parachute control method for the aircraft according to claim 12, wherein judging whether the aircraft is in the normal flight state comprises: when the time interval is greater than a predetermined value of the time interval, confirming that the aircraft is in the abnormal flight state through the first control device.

14. The parachute control method the aircraft according to claim 9, wherein the aircraft flight state comprises a remaining battery power of the aircraft; wherein sensing the flight state of the aircraft by the sensor device comprises:

detecting the remaining battery power of the aircraft by a detector for remaining battery power.

15. The parachute control method for the aircraft according to claim 14, wherein judging whether the aircraft is in the normal flight state comprises: when the remaining battery power of the aircraft is less than a predetermined value of battery power, confirming that the aircraft is in the abnormal flight state through the first control device.

16. The parachute control method for the aircraft according to claim 9, wherein the parachute control method further comprises:

receiving a control command from a remote controller triggered by a user, and transmitting a remote control signal to the second control device in accordance with the control command;

terminating operation of the aircraft through the second control device in accordance with the remote control signal, converting the remote control signal into a third control signal and transmitting the third control signal to the first control device;

converting the third control signal into a fourth control signal through the first control device, and transmitting the fourth control signal to the drive device; and driving the parachute to open through the drive device.

* * * * *